United States Patent Office 3,254,210
Patented May 31, 1966

3,254,210
METHOD FOR DETERMINING ORGANICALLY BOUND HALIDE IN A LIQUID
Roman A. Schmitt, San Diego, Calif., assignor to General Dynamics Corporation, New York, N.Y., a corporation of Delaware
No Drawing. Filed Aug. 16, 1961, Ser. No. 131,746
3 Claims. (Cl. 250—43.5)

The present invention generally relates to concentration determinations, and more particularly relates to a method of determining the total concentration of a given element bound to organic molecules, for example, the total organic halide content in water-immiscible substances, such as butterfat, the fat phase of milk, hydrocarbon oils, etc., and in substances containing such water-immiscible phases.

The subject matter of the present invention has wide application. Thus, for example, it is particularly important to provide accurate means for determining the presence of toxic substances in food products and the like. Pesticides, such as insecticides, fungicides, germicides, bactericides and other toxic agents utilized to control deleterious micro-organisms and macro-organisms, which may attack or otherwise debilitate crops, etc., are extensively utilized, as in crop-dusting operations. However, many of such toxic agents, for example, DDT, that is dichlorodiphenyltrichloroethane, Toxaphene, that is, chlorinated camphene, and similar halogenated aryl organic molecules, are capable of being ingested by ruminants and other domestic animals with the crops (fodder, silage, grasses) being fed. Products, such as milk and the like, obtained from such domestic animals may require analysis to determine the presence of significant concentrations of such toxic agents affecting the acceptability of such products for human consumption.

A relatively simple, rapid and accurate procedure of activation analysis has now been found to determine relative concentrations in the range of from parts per million to parts per billion by weight of halogens bound to organic molecules and, hence, the concentrations of such halogenated organic toxic substances in dairy products and the like. The results obtained with this procedure compare favorably with longer, more complicated, time-consuming procedures utilized heretofore.

Moreover, this procedure is also suitable for determination of the total concentration of halogenated organic substances in various other organic water-immiscible substances, such as petroleum hydrocarbon oils, tars, greases and the like, and substances containing water-immiscible phases. Thus, the procedure is beneficial in analysis of motor oils containing organic halogenated detergents, surfactants, etc. Various other types of synthetic and natural lubricants can be effectively analyzed by this procedure.

It will also be understood that the method of the present invention is applicable to the determination of the total concentration of an organically bound element in a multi-phase system containing immiscible phases, provided the element to be measured can be activated so as to produce a measurable concentration of a radioactive isotope of suitable half life. For example, the total concentration of organically bound phosphorus (or phosphate), iodide, bromide, etc., of butterfat, or the total amount of a chelated metal, such as sodium, potassium, lithium, calcium, magnesium, etc., in oil can be readily determined by the method of the present invention.

Accordingly, it is the primary object of the present invention to provide a method for determining the total concentration of an organically bound element in a substance. It is a further object to provide a method of determining the total concentration of an organically bound element in an oleaginous substance. It is a further object to determine the total concentration of halogenated organic substances in substances containing water-immiscible phases. It is a further object of the present invention to provide a simple, relatively rapid method for accurately analyzing organic water-immiscible substances, such as butterfat, milk fat and the like dairy products, for the total concentration of halogens and other elements bound to organic molecules. It is also an object of the present invention to provide a method of determining the total concentration of chelated metal in an oleaginous system. Further objects and advantages of the present invention will be apparent from a study of the following detailed description.

The present invention comprises a method of activation analysis which includes intimately mixing an organic phase containing an organically-bound element, the concentration of which is to be determined, with an immiscible phase so as to provide substantially complete removal from the organic phase of that portion of the indicated element which is not organically bound. Such intimate mixing is effected satisfactorily due to the use of selected solvents and vigorous agitation. After the indicated separation, the organically-bound element is subjected to activation irradiation and the radioactivity induced therein is determined, as against a control sample of known concentration of the element, the radioactivity being a measurement of the concentration of the organically-bound element.

By organic binding of the element is meant coupling of the element with organic molecules, the fat phase of butter, milk, cheese, etc.

One particularly suitable application of the method of the present invention is in the activation irradiation of halogens bound to organic molecules to determine accurately the concentrations of such halogenated organic substances. More specifically, the inorganic halide concentration of a substance containing a water-immiscible phase is first reduced substantially to zero in a highly efficient yet simple manner. Thereafter, the total remaining halogen present (i.e., that bound to organic molecules) in the water-immiscible phase is subjected to irradiation to activate the halogen and form one or more radioisotopes thereof. The radioactivity thereof can be simply and accurately measured to determine the total concentration of halogen remaining in the substance. This concentration represents the effective concentration of halogenated organic substances, such as insecticide or other toxic agents, in the material being analyzed.

The determination can be carried out with a degree of accuracy sufficient to determine levels of between parts per million and parts per billion of the halogenated organic molecules in the material tested.

Now referring more specifically to the indicated example of the method of the present invention, a substance containing an organic water-immiscible phase, for example, butterfat, the fat phase of milk or the like, is isolated and subjected to suitable treatment to initially reduce the total inorganic halogen concentration thereof (i.e., halogen in inorganic compounds) to essentially nil, without substantially reducing the total organic halide concentration in the water-immiscible phase.

It is an important part of the present invention that this step be carried out efficiently, rapidly and inexpensively. Thus, it has been found that this step should be carried out by water extraction of the inorganic halide from the substance being tested under conditions which substantially increase the total surface area of the substance tested.

More particularly, in accordance with the present invention, the organic substance being tested is first converted to a liquid form, as by melting or the like, to facilitate extraction and is usually then contacted with a suitable concentration of purified water, particularly demineralized water, that is, water which has been subjected to ion removal by cation and anion exchange resins, etc. The water is used to separate out occluding substances, e.g., precipitate proteins from butter, etc. After removal of the proteins and water, the fat phase thus obtained is then contacted by a selected purified water-immiscible organic solvent, such as heptane, a mixture of hexanes, etc., (which solvent has a minimal concentration of the halogen to be tested for, e.g., less than 0.5 µg. of chlorine per 7 ml.). The organic solvent thus increases the surface area of the fat phase and thereby aids extraction when water is added.

Demineralized or otherwise purified water is then added to the fat-solvent mixture and vigorous agitation is carried out to water extract the inorganic halide it is desired to remove from the fat-solvent phase, i.e., from the organically bound form of the halide in the fat phase. The water concentration with respect to the fat phase can vary. The vigorous agitation can be successfully carried out utilizing a mechanical agitator, such as a Burrel-Wrist Action Shaker, Model BB or the like. Multiple extractions are carried out until the concentration of the inorganic halide being extracted from the fat phase has been reduced to essentially nil. Suitable water extractions can usually be carried out when, for example, the volume of water per each extraction is between 0.1 and 10 times the volume of water-immiscible liquid phase contacted. The concentration of the organic solvent with respect to the fat can be varied. Preferably it is between 1 and 4 times the volume of the fat. As a specific example of the described steps, 10 cc. of butter is first melted and then contacted, with stirring, with 10 cc. of demineralized water. The clear butter fat is then pipetted from the water-protein and is passed into 7 cc. of purified heptane. About 10 cc. of demineralized water is added, and the mixture is violently agitated over a short period of time, e.g., 2 minutes, that is, until the water has thoroughly and intimately contacted substantially all portions of the butter fat-heptane phase and has extracted inorganic halide therefrom.

After the contacting period, the water containing the inorganic halide is then separated in any suitable manner from the remaining water-immiscible substance. This can be conveniently accomplished by draining off the halide-containing water from a separatory funnel containing the mixture. Alternatively, the water can be removed by decanting and/or pipetting from the water-immiscible phase of the mixture. Other suitable separation methods will be obvious to those skilled in the art. Preferably, the remaining fat organic solvent mixture is washed with additional water before reextraction is carried out.

In practice, it has been found that two such successive water extractions with vigorous agitation usually result in essentially complete removal of inorganic halide from the substance undergoing testing, i.e., complete separation of inorganic halide from the water-immiscible phase, without substantially reducing the total concentration of halogen bound to organic molecules in the water-immiscible phase. The extractions are successful provided that the agitation is sufficiently vigorous and extensive. The described extraction steps also have the effect of removing from the fat-solvent phase other inorganic components such as metal i.e., sodium, potassium, calcium, magnesium, iron, sulfur and phosphorus.

Thereafter, the extracted water-immiscible or fat-solvent phase undergoing testing is subjected to activation irradiation for a sufficient period of time to bring about production of measurable concentrations of radio-active isotope(s) of the halogen bound with the organic molecules in the water-immiscible phase. The activation irradiation can be brought about by subjecting the test substance to, for example, bombardment with neutrons, charged particles or photons, etc., in a reactor, particle accelerator, etc. In order to accurately measure the halogen radioisotope concentration thus produced, an activation irradiation is also simultaneously carried out in the same irradiation facility at the same exposure on a known concentration of halogen, i.e., a standard water solution of the halide having about the same hydrogen density as the test sample (water-immiscible phase). After the simultaneous irradiation of both the test sample and the standard solution, the radioactivity of each is measured. Comparison of the radioactivity level of the test sample with that of the irradiated standard determines the concentration of halogen bound to organic molecules in the test sample.

As an example, melted butter in heptane is subjected to the indicated two or more successive water extractions to remove inorganic halide and is then neutron irradiated in a neutron flux, for example, of about $1.8 \times 10^{12}$ neutrons/cm.$^2$/sec. for 15 minutes, together with a standard comprising an aqueous solution containing ammonium chloride in known concentration. The heavier chlorine isotope, $Cl^{37}$, in the test sample and the standard solution is transmuted to the 37.3 minute chlorine radioisotope $Cl^{38}$. The lighter isotope $Cl^{35}$ is converted to $Cl^{36}$, having a half-life of $3 \times 10^5$ years. The induced radioactivity of $Cl^{38}$ is 0.03 µcuries/µg. of natural chlorine, i.e., about $6 \times 10^4$ disintegrations of $Cl^{38}$ per minute.

Decay of 37.3 minute $Cl^{38}$ is via emission of energetic beta particles and accompanying gamma rays of 2.16 and 1.61 mev. energies. The resultant atom or nucleus from decay of the $Cl^{38}$ is $A^{38}$, a stable atom. The radioactivity of the test sample of irradiated butter and that of the irradiated standard ammonium chloride solution may therefore be measured by a standard scintillation spectrometric technique or by beta counting, etc. The respective radioactivities are then compared to determine the total chlorine concentration remaining in the butter. Such chlorine concentration corresponds to the concentration of chlorine-containing toxic substance in the butter.

Tests have shown that such a procedure is sensitive to a concentration of about 5 parts per billion of chlorine-containing organic molecules in water-immiscible substances and phases tested.

It has been found that the neutron flux will in part determine the sensitivity of the procedure and that the sensitivity is directly proportional to the neutron flux. Obviously, the test success depends upon the removal of all or essentially all of the inorganic chloride from the compound tested before irradiation of the compound. A mechanical shaker increases the speed and efficiency with which the extraction of the inorganic halide is carried out.

It will be obvious that the indicated example of the method of the present invention is equally applicable to an accurate determination of total organic iodine or bromine concentration as well as chlorine concentration and that in such instances where detection for bromine or iodine is carried out the standard solution irradiated simultaneously with the water-extraction compound may, instead of being ammonium chloride or other suitable chlorine compound, be a suitable bromine or iodine compound.

Various of the features of the present invention are illustrated in the following examples:

*Example I*

A total of 7–10 cc. of butter was placed in a conical centrifuge tube and about 10 ml. of demineralized water was added thereto. The tube was placed in a water container on a hot plate and the butter was melted. Stirring of the melted butter and water mixture for about 20 seconds caused precipitation and settling of the protein. The tube was then centrifuged for about 2 minutes in a clinical centrifuge operating at about 2000 r.p.m. Immediately thereafter, about 3.0 ml. of clear butter fat was pipetted therefrom and into 7 ml. of heptane (having less than 0.5 μg. chlorine) in a 60 ml. cylindrical separatory funnel. Approximately 10 cc. of demineralized water was then added to the separatory funnel, which was then placed in a mechanical shaker (Burrel-Wrist Action Shaker, Model BB) and shaken for 2 minutes (about 300 180° out of phase shakes over a 2 inch half shake). The water was then drained from the funnel, and a few ml. of demineralized water was added as a wash and again drained from the funnel. About 10 ml. of demineralized water was then added to the funnel and the mixture was again shaken for 2 minutes, as previously described. The water was then drained from the funnel, and 5 ml. of demineralized water was added and drained from the funnel as a wash. The treated butterfat in heptane was then drained into a 4 dram polyethylene vial and the vial was heat sealed. The vial was placed in a polyethylene irradiation tube in an irradiation facility in a neutron reactor. A separate polyethylene vial containing approximately 30 μg. chlorine in water solution (i.e., an aqueous ammonium chloride solution) was also placed in a 4 dram polyethylene vial. A heptane sample (7 ml. of heptane) was placed in a third polyvial. The ammonium chloride-containing vial and the heptane vial were placed in the same irradiation facility as the test sample. Thereupon, the three samples were subjected to the same neutron flux of approximately $1.8 \times 10^{12}$ neutrons per cm.$^2$ per second for about 15 minutes, after which the three samples were withdrawn from the irradiation facility, placed in unirradiated polyvials, heat sealed and the radioactivity of each sample was measured as follows:

Each vial, in turn, was placed on a 3″ x 3″ sodium iodide crystal in a 4″ thick lead shield with the vial on the surface of a ½″ absorber atop the crystal. The gamma pulses from the 2.16 mev. gamma rays of the 37.3-minute $Cl^{38}$ were counted. Calculating the total chloride in the butter fat was accomplished by comparing the 2.16 mev. peak height. The test and control samples were also counted after the $Cl^{38}$ decay. Under certain circumstances, it is more advantageous to compare the counting rates of the 1.61 mev. gamma rays of the $Cl^{38}$ rather than the 2.16 mev. gamma rays in a manner similar to the foregoing. The total amount of organically bound chloride was also determinable as follows:

The organically bound chloride, Clo. in the 3.00 cc. of butterfat, expressed in micrograms = $A/B \times Cls$, where Cls is the amount in micrograms of chlorine in the standard sample, A is the radioactivity of the test sample and B is the radioactivity of the control or standard, calculated as measured at the same time after the end of the irradiation.

Successive identical tests performed as indicated above were carried out on other aliquots of the same butter and in each instance the chlorine concentration was determined to be about 1 p.p.m. The reproducibility of the method of the present invention for determination of the total organic chloride was confirmed. Moreover, the accuracy of the method was confirmed by comparable results obtained by more lengthly, complicated analyses.

The method of the present invention as illustrated in Example 1, is accurate, simple and relatively rapid, requiring only a relatively short period of time to remove inorganic chloride from the butter and only a further short period of time to irradiate the resulting treated butter and to determine the level of total organic chloride present in the irradiated butter. It will be obvious that a large number of samples of various butter lots can be simultaneously subjected to the mixing, extraction, separation and irradiation steps, and the radioactivity thereof can also be determined essentially simultaneously, so as to reduce the amount of the time required for each sample.

Accordingly, an effective, accurate method of rapidly determining the total organic halide concentration in a water-insoluble compound is provided which is equally applicable to chloride, bromide and iodide determinations.

*Example II*

A plurality of butter samples were treated according to the method of the present invention. The steps and technique employed for each of the samples was as set forth in Example I, except that the number of water cycles varied from two 1 minute cycles to six 5 minute cycles. Since the content of total organic chloride remained constant, two 2 minute cycles have been chosen for convenience and optimum inorganic chloride removal. The observed total organic chloride, as determined by radioactive measurement after neutron irradiation in accordance with the present invention, is set forth in the following Table I.

TABLE I.—TOTAL CHLORIDE CONTENT IN BUTTER BY NEUTRON ACTIVATION ANALYSIS

[Butterfat, heptane and 10 cc. water autoshaking]

| Washes (min.): | Cl, p.p.m. |
|---|---|
| 2–1 | 1.3±0.1 |
| 2–3 | 1.4±0.1 |
| 2–5 | 1.3±0.1 |
| 4–5 | 1.3±0.1 |
| 6–5 | 1.2±0.1 |

To demonstrate that equivalent results are obtainable through the use of mixed hexane instead of heptane, the experimental results shown in Table II can be obtained.

TABLE II.—COMPARISON OF THE TOTAL ORGANIC CHLORIDE OBSERVED IN BUTTERFAT VIA HEPTANE-WATER-AUTO-SHAKE AND THE MIXED-HEXANE - WATER - AUTOSHAKE NEUTRON ACTIVATION METHODS

Hexane-water-
 autoshake _____ 0.81±0.06 μg. of total organic chloride/cc. of butterfat.

Heptane-water-
 autoshake _____ 0.83±0.03 μg. of total organic chloride/cc. of butterfat.

The butterfat used was the same throughout these experiments.

The experiments presented in Table III indicate that the mixed hexane-water-auto-shake procedure determines quantitatively the total organic chloride content in a butterfat phase.

TABLE III.—TOTAL ORGANIC CHLORIDE CONTENT IN ORGANIC CHLORIDE SPIKED BUTTERFAT BY NEUTRON ACTIVATION ANALYSIS [a]

| Butterfat | Total Organic Chloride Added | Total Organic Chloride Found |
|---|---|---|
| 2.46 gm | 6.7 μg. chloride as Toxaphene | 7.1±1.2 μg. chloride.[b] |
| 2.46 gm | 4.6 μg. chloride as DDT | 5.1±0.6 μg. chloride.[b] |

[a] Via two-2 min. cycles of autoshaking of butterfat, mixed hexane, and water phases. Duplicate analyses for each result.
[b] A total organic chloride background of 3.1±0.4 μg. due to 2.46 gm. butterfat blank and the 7 cc. of mixed hexane has been subtracted.

The preceding examples clearly illustrate some applications to which the method of the present invention can be extended. The method is effective, accurate, rapid and simple. Other advantages of the method of the present invention are set forth in the foregoing.

Various of the features of the present invention are set forth in the appended claims.

What is claimed is:

1. A method for determining the total concentration of organically bound halide in an oleaginous liquid mixture, said halide being present in said mixture both as an organically bound halide and as an inorganically bound halide, said organically bound halide being water-immiscible and said inorganically bound halide being water-miscible, said organically bound halide being present in the fat phase of said mixture, which method comprises the steps of contacting said oleaginous mixture with mineral-free water to remove occluding substances from said fat phase and separating said fat phase from said mineral free water, dissolving said fat phase in an aliphatic water-immiscible solvent forming a water-immiscible phase, extracting residual inorganically bound halide present in said water-immiscible phase by mixing said water-immiscible phase with separate batches of mineral-free water under conditions of vigorous agitation, whereby said residual inorganically bound halide is extracted from said water-immiscible phase, separating said water-immiscible phase from said water and continuing the batch extraction until substantially all of said residual inorganically bound halide has been removed from said water-immiscible phase, thereafter irradiation activating the organically bound halide in said water-immiscible phase, whereby at least one measurable halide radioisotope is provided, and measuring the radioactivity of said radioisotope, whereby the concentration of said organically-bound halide is readily determinable.

2. A method for determining the total concentration of organically bound halide in a fat containing dairy product which includes both organically bound halide and inorganically bound halide, which method comprises the steps of contacting the dairy product while in a molten state with demineralized water and agitating the mixture until the fat phase of said dairy product containing said organically bound halide separates from the remainder of said dairy product, removing said fat phase from contact with the remainder of said dairy product and dissolving said fat phase in an organic water-immiscible solvent selected from the group consisting of heptane and hexane to form a water-immiscible phase, extracting residual inorganically bound halide present in said water-immiscible phase by mixing said water-immiscible phase with a plurality of batches of mineral-free water under conditions of vigorous agitation, whereby said residual inorganically bound halide passes from said water-immiscible phase into said water, separating said water-immiscible phase from said water after each batch extraction and continuing said batch extraction until substantially all of said residual inorganically bound halide has been removed from said water-immiscible phase, thereafter irradiation activating said organically bound halide in said water-immiscible phase, whereby at least one measurable halide radioisotope is provided, and measuring the radioactivity of said radioisotope in comparison with a standard solution containing a known concentration of halide, which standard solution has been identically and simultaneously irradiation activated with said organically bound halide, whereby the concentration of said organically bound halide in said dairy product is readily determinable.

3. A method for determining the total concentration of organically bound chloride in milk which includes both organically bound chloride and inorganically bound chloride, which method comprises the steps of contacting milk with demineralized water and maintaining said contact until the fat phase of said milk separates from the remainder of said milk, said fat phase containing said organically bound chloride and residual inorganically bound chloride, separating said fat phase from said water and dissolving the same in an aliphatic water-immiscible solvent selected from the group consisting of heptane and hexane to form a water-immiscible phase, water extracting said residual inorganically bound chloride contained in said fat phase by mixing said water-immiscible phase and mineral-free water under conditions of vigorous agitation, whereby said inorganically bound chloride in said fat phase passes to said water, separating said water-immiscible phase from said water, repeating said steps of water extracting said residual inorganically bound chloride until essentially all of said residual inorganically bound chloride has been removed from said water-immiscible phase, thereafter neutron activating said organically bound chloride in said water-immiscible phase, whereby chlorine radioisotopes are provided, and measuring the radioactivity of said chlorine radioisotopes in comparison with the radioactivity of a standard solution containing a known concentration of chlorine, which standard solution has been identically and simultaneously neutron activated with said organically bound chloride, whereby the concentration of said organically bound chlorine in said milk is readily determinable.

References Cited by the Examiner

UNITED STATES PATENTS

| 2,367,949 | 1/1945 | Langer | 23—230 |
| 2,585,901 | 2/1952 | Dieke | 23—230 |
| 2,744,199 | 5/1956 | Juterbock et al. | 250—43.5 |
| 2,827,364 | 3/1958 | Ladisch | 23—230 |
| 2,873,377 | 2/1959 | McKay | 250—43.5 |
| 2,938,119 | 5/1960 | McKay | 250—43.5 |
| 2,983,817 | 5/1961 | Earley | 250—83.3 |

OTHER REFERENCES

Fahey et al., "Anal. Chem.," 23, 1826–29 (1951).
Claborn et al., Ibid., 24, 220–222 (1952).
Ginsburg et al., Ibid., 30, 2039, 2040 (1958).

MORRIS O. WOLK, *Primary Examiner.*

ANTHONY SCIAMANNA, *Examiner.*

D. E. GANTZ, ZOLTAN PAROCZAY,
*Assistant Examiners.*